US012368260B2

(12) United States Patent
Hashimoto et al.

(10) Patent No.: US 12,368,260 B2
(45) Date of Patent: Jul. 22, 2025

(54) INTERPOSER WITH CONTACTS HAVING INWARDLY PROTRUDING PRESS-FIT PORTIONS

(71) Applicant: Tyco Electronics Japan G.K., Kawasaki (JP)

(72) Inventors: Naoki Hashimoto, Kawasaki (JP); Masayuki Aizawa, Kawasaki (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 329 days.

(21) Appl. No.: 18/188,620

(22) Filed: Mar. 23, 2023

(65) Prior Publication Data

US 2023/0307860 A1 Sep. 28, 2023

(30) Foreign Application Priority Data

Mar. 23, 2022 (JP) ................................ 2022-046166

(51) Int. Cl.
*H01R 13/24* (2006.01)
*H01R 12/58* (2011.01)
*H01R 12/71* (2011.01)
*H01R 13/504* (2006.01)

(52) U.S. Cl.
CPC ......... *H01R 13/2435* (2013.01); *H01R 12/58* (2013.01); *H01R 12/714* (2013.01); *H01R 13/5045* (2013.01)

(58) Field of Classification Search
CPC .. H01R 13/2435; H01R 12/58; H01R 12/714; H01R 13/5045; H01R 12/7076; H01R 12/716; H01R 13/46; H01R 33/74
See application file for complete search history.

(56) References Cited

U.S. PATENT DOCUMENTS 6,921,270 B2 * 7/2005 Mendenhall ....... H01R 13/2435 439/71
11,177,603 B2 11/2021 Hashimoto et al.
2004/0102066 A1 * 5/2004 Ortega ............... H01R 13/2442 439/83
2006/0094280 A1 * 5/2006 Hayakawa ........... H01R 13/193 439/331
2019/0150311 A1 * 5/2019 Mason ................. H05K 3/3436 439/55
2020/0203866 A1 * 6/2020 Hashimoto ........ H01R 13/2435

FOREIGN PATENT DOCUMENTS

JP 202118960 A 2/2021

* cited by examiner

*Primary Examiner* — Travis S Chambers

(57) ABSTRACT

A contact includes a base portion having a first end and a second end, a first extending portion extending from first end of the base portion and having a first contact portion, and a second extending portion extending from the second end of the base portion and having a second contact portion. The base portion extends between the first end and the second end. The base portion has a pair of base portion beams having a first space therebetween. Each of the base portion beams has a press-fit portion protruding from one of the base portion beams toward the other of the base portion beams; the press-fit portions are press-fittable into a housing and supportable by the housing.

18 Claims, 14 Drawing Sheets

INTERPOSER WITH CONTACTS HAVING INWARDLY PROTRUDING PRESS-FIT PORTIONS

CROSS-REFERENCE TO RELATED APPLICATIONS

This application claims the benefit of the filing date under 35 U.S.C. § 119(a)-(d) of Japanese Patent Application No. 2022-046166, filed on Mar. 23, 2022.

FIELD OF THE INVENTION

The present invention relates to a contact having an interposer interposed between two electronic components for electrically connecting the electronic components together, and to an interposer including the contact.

BACKGROUND

An interposer interposed between two electronic components for electrically connecting the electronic components together is conventionally known. This interposer includes a planar housing having a large number of through-holes arranged therein, and a large number of contacts inserted into respective ones of the large number of through-holes and retained in the housing.

In an interposer disclosed in JP 2021-18960A, a contact including a press-fit portion protruding widthwise outward from widthwise opposite ends of a base portion is disclosed. This contact is supported by the housing with the press-fit portion press-fitted onto a wall of the housing.

The contact in JP 2021-18960A includes the press-fit portion protruding outward from the widthwise opposite ends of the base portion. This requires a wall of the housing between the contacts adjacent to each other that is thick enough to support the contacts with the press-fit portions press-fitted thereonto. This makes it difficult to position the adjacent contacts closer to each other, and makes it difficult to improve electrical characteristics by bringing them closer. In view of these circumstances, an object of the present invention is to provide a contact enabling an improvement in electrical characteristics by bringing contacts closer to each other, and an interposer including the contact.

SUMMARY

A contact includes a base portion having a first end and a second end, a first extending portion extending from first end of the base portion and having a first contact portion, and a second extending portion extending from the second end of the base portion and having a second contact portion. The base portion extends between the first end and the second end. The base portion has a pair of base portion beams having a first space therebetween. Each of the base portion beams has a press-fit portion protruding from one of the base portion beams toward the other of the base portion beams; the press-fit portions are press-fittable into a housing and supportable by the housing.

BRIEF DESCRIPTION OF THE DRAWINGS

Exemplary embodiments of the invention are described by way of the following drawings. In the drawings.

DETAILED DESCRIPTION OF THE EMBODIMENT(S)

Embodiments of the present invention will be described below.

Figure 1:
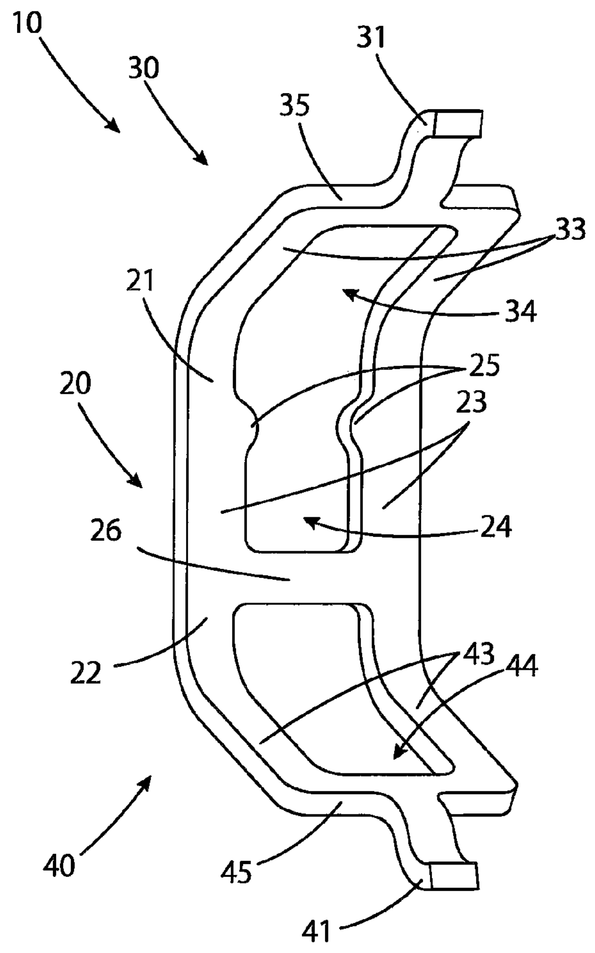
FIG. 1 is an isometric view of an embodiment of a contact of the present invention.

FIG. 1 is an isometric view of an embodiment of a contact 10 of the present invention.

Figure 2A:
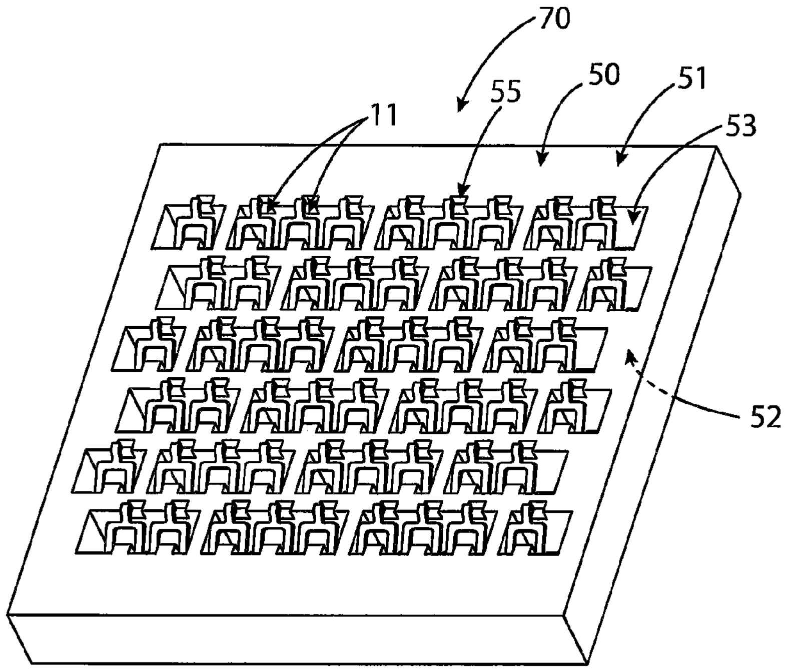
FIG. 2A is an isometric view of a first embodiment of an interposer of the present invention.
Figure 2B:
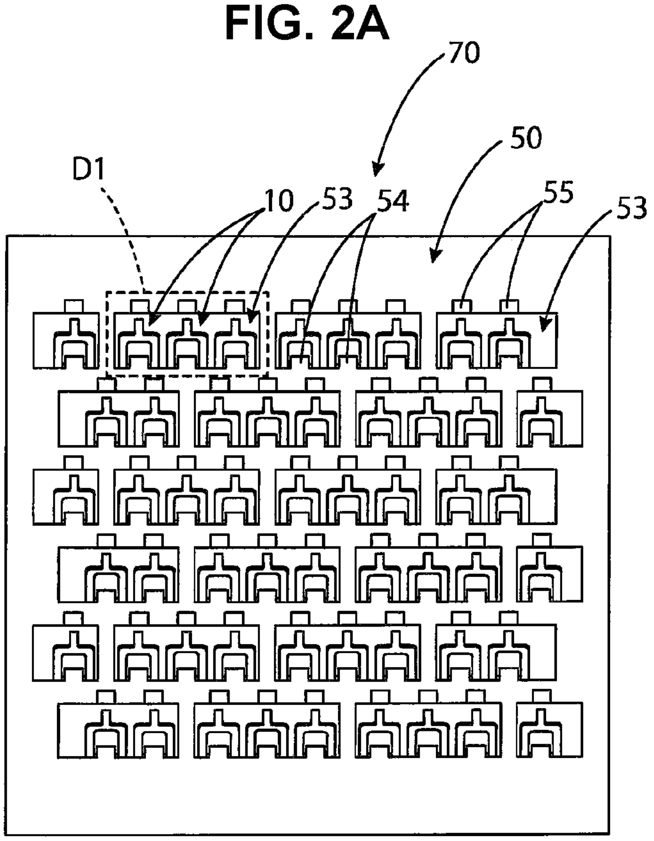
FIG. 2B is a top view of the first embodiment of the interposer of the present invention.

In addition, FIGS. 2A and 2B are an isometric view and a top view, respectively, of a first embodiment of an interposer 70 of the present invention. This first embodiment of the interposer 70 shown in FIGS. 2A and 2B has the contacts 10 arranged therein that are shown in FIG. 1. Though the interposer 70 has as much as 4000 contacts, for example, arranged therein, FIGS. 2A and 2B show a small-scale interposer 70 having a greatly limited number of contacts 10. The same applies to each of embodiments of the interposer including second and subsequent embodiments that will be described later.

Figure 3A:
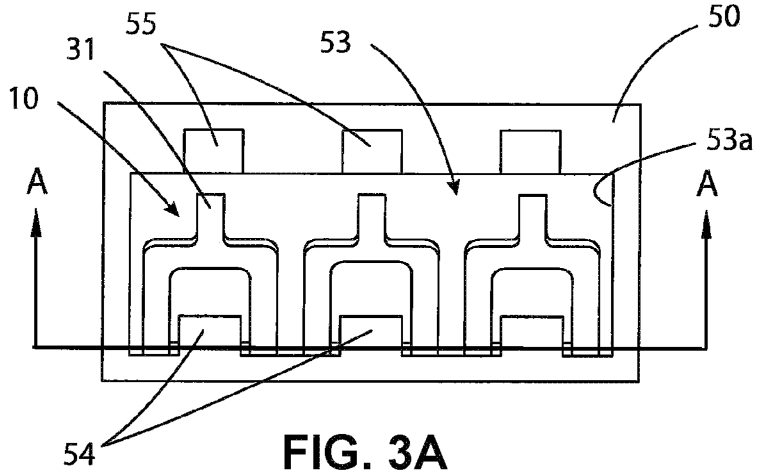
FIG. 3A is an enlarged view of a portion in a region D1 shown in dashed lines in FIG. 2B.
Figure 3B:
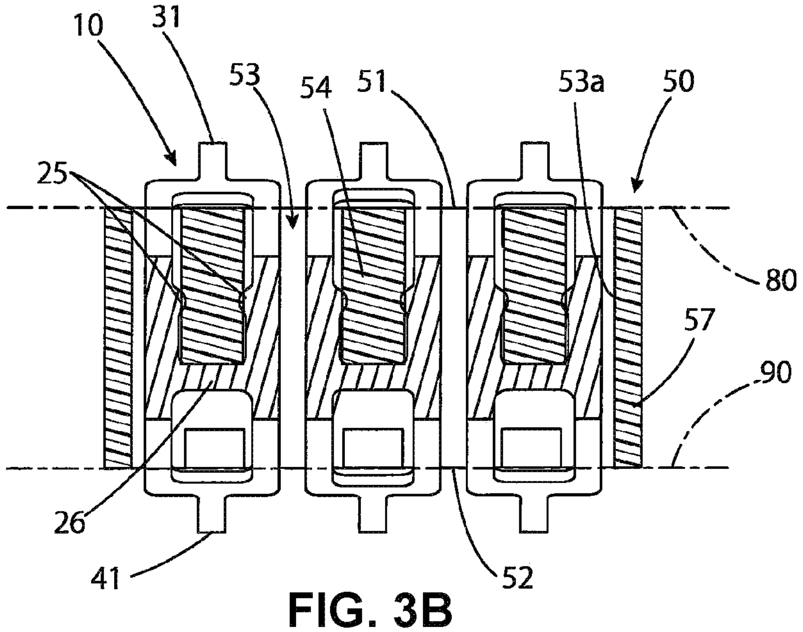
FIG. 3B is a sectional view taken along an arrowed line A-A of FIG. 3A.

Furthermore, FIGS. 3A and 3B are an enlarged view and a cross sectional view taken along an arrowed line A-A shown in the enlarged view, respectively, of a portion in a region D1 shown in dashed lines in FIG. 2B.

Here, mainly with reference to FIG. 1, the contact 10 shown in FIG. 1 will be first described. The contact 10 has a base portion 20. Herein, a portion extending between a first end 21 and a second end 22 that are two ends of the base portion 20 is referred to as the base portion 20. In addition to the base portion 20, this contact 10 has a first extending portion 30 and a second extending portion 40.

The first extending portion 30 extends from the base portion 20 continuously with the first end 21 of the base portion 20. In the present embodiment, this first extending portion 30 extends obliquely upward as a whole relative to the base portion 20. Furthermore, this first extending portion 30 has a first contact portion 31 formed thereon for contacting an IC (Integrated Circuit) 80 (see FIG. 3B).

Likewise, the second extending portion 40 extends from the base portion 20 continuously with the second end 22 of the base portion 20. In the present embodiment, this second extending portion 40 extends obliquely downward as a whole relative to the base portion 20. Furthermore, this second extending portion 40 has a second contact portion 41 formed thereon for contacting a circuit board 90 (see FIG. 3B).

Here, the IC 80 and the circuit board 90 are equivalent to examples of a first electronic component and a second electronic component, respectively, as referred to in the present invention.

The base portion 20 includes two base portion beams 23, as shown in FIG. 1. These base portion beams 23 extend vertically with a first space 24 therebetween. In addition, each of the two base portion beams 23 includes a press-fit portion 25 protruding from one of the base portion beams 23 toward the other base portion beam 23. These press-fit portions 25 have the role of being press-fitted into a housing 50 (see FIGS. 2A and 2B), thereby causing the housing 50 to support the contact 10. This enables the contacts 10 adjacent to each other to be brought closer to each other.

The base portion 20 includes a connecting column 26 connecting the two base portion beams 23 together on the second end 22 side. Since this connecting column 26 is included, the strength of the contact 10 is retained.

Likewise, the first extending portion 30 includes two first extending portion beams 33. These two first extending portion beams 33 extend obliquely upward as a whole relative to the base portion 20, from the first end 21 of the base portion 20, with a second space 34 therebetween that is continuous with the first space 24. This first extending portion 30 further includes a first end column 35. The first end column 35 connects the first extending portion beams 33 together on a side far from the base portion 20 where the two first extending portion beams 33 extend obliquely upward relative to the base portion 20.

The first contact portion 31 protrudes from the first end column 35 in a direction away from the base portion 20.

Since, in this manner, the second space 34 extending between the two first extending portion beams 33 is made as a space continuous with the first space 24, the operation of press-fitting the press-fit portion 25 onto a wall of the housing is facilitated.

Likewise, the second extending portion 40 includes two second extending portion beams 43. These two second extending portion beams 43 extend obliquely downward as a whole relative to the base portion 20, from the second end 22 of the base portion 20, with a third space 44 therebetween. The third space 44 extending between these two second extending portion beams 43 is a space separated from the first space 24 extending between the two base portion beams 23 by the connecting column 26.

This second extending portion 40 includes a second end column 45 connecting the two second extending portion beams 43 together on a side far from the base portion 20 where the two second extending portion beams 43 extend obliquely downward relative to the base portion 20. Furthermore, the second contact portion 41 protrudes from the second end column 45 in a direction away from the base portion 20.

In this manner, both retention of the strength of the contact 10 by including the above-described connecting column 26 separating the first space 24 extending between the two base portion beams 23 from the third space 44 extending between the two second extending portion beams 43, and facilitation of the operation of inserting the contact 10 into a through-hole 53 of the housing 50 and press-fitting the press-fit portion into the housing 50 by making the second space 34 extending between the two first extending portion beams 33 as a space continuous with the first space 24 extending between the two base portion beams 23, are achieved.

An interposer 70 shown in FIGS. 2A and 2B is composed of one housing 50 and a plurality of contacts 10 shown in FIG. 1. This interposer 70 is an electronic component having the role of being interposed between the IC 80 and the circuit board 90, as shown in FIG. 3B, and electrically connecting the IC 80 and the circuit board 90 together.

The housing 50 constituting this interposer 70 has a planar shape as a whole, and has a first face facing the IC 80 and a second face facing the circuit board 90. This housing 50 is provided with a plurality of through-holes 53, and, in an example shown here, one to three contacts 10 are positioned in each through-hole 53.

Each contact 10 has the base portion 20 positioned in the through-hole 53, has the first extending portion 30 extending on the first face 51 side, and has the second extending portion 40 extending on the second face 52 side.

The housing 50 is provided with a supporting portion 54 protruding from an inner wall face 53*a* of the through-hole 53 into the through-hole 53. This supporting portion 54 corresponds to the contact 10 positioned in the through-hole 53, and protrudes between the two base portion beams 23 constituting the base portion 20 of the contact 10. When the contact 10 is inserted into the through-hole 53, the press-fit portion 25 of the contact 10 is press-fitted onto this supporting portion 54, and thereby the contact 10 inserted is supported by the housing 50. As described above, there is no element on the first extending portion 30 side that corresponds to the connecting column 26 lying on the second extending portion 40 side, and the second space 34 extending between the two first extending portion beams 33 is a space continuous with the first space 24 extending between the two base portion beams 23. Since in this manner the second space 34 extending between the two first extending portion beams 33 is made as a space continuous with the first space 24, the operation of press-fitting the press-fit portion 25 onto a wall of the housing is facilitated.

Since this supporting portion 54 is located between the two base portion beams 23 constituting the base portion 20 of one contact 10, the supporting portion 54 does not become an obstruction to positioning the contacts 10 adjacent to each other in one through-hole 54 in proximity to each other, so that the adjacent contacts 10 can be positioned sufficiently close to each other in consideration of electrical characteristics.

FIG. 3B shows the contacts 10 in a shape when they are free from any external force from the IC 80 and/or the circuit board 90. On the other hand, the IC 80 and/or the circuit board 90 are positioned in contact with the first face 51 and the second face 52, respectively, of the housing 70, as shown in FIG. 3B. This causes the first extending portion 30 and the second extending portion 40 of the contact 10 to be pressed by the pressure of the IC 80 and the circuit board 90 and elastically deform. The housing 50 has a recessed portion 55 formed in a position adjoining the through-hole 53 on the first face 51 side and on the second face 52 side for receiving the first contact portion 31 and the second contact portion 41 when the first extending portion 30 and the second extending portion 40 elastically deform.

Figure 4:
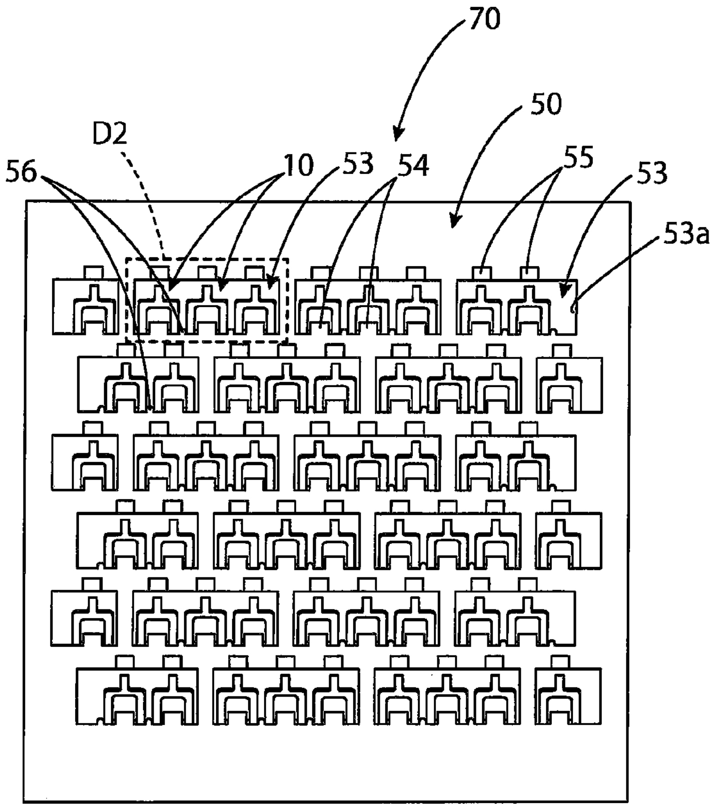
FIG. 4 is a top view of a second embodiment of the interposer of the present invention.
Figure 5:
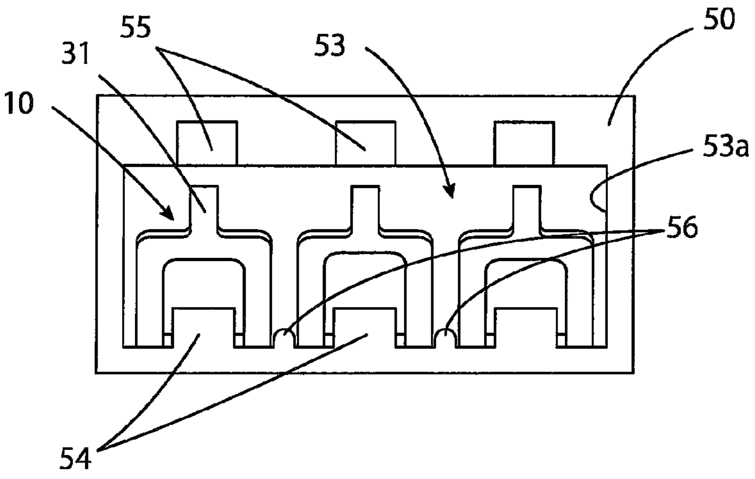
FIG. 5 is an enlarged view of a portion in a region D2 shown in dashed lines in FIG. 4.

FIG. 4 is a top view of a second embodiment of the interposer 70 of the present invention. This second embodiment of the interposer 70 shown in FIG. 4 also has the contacts 10 arranged therein that are shown in FIG. 1. In addition, FIG. 5 is an enlarged view of a portion in a region D2 shown in dashed lines in FIG. 4. For the purpose of describing each of embodiments including this second and subsequent embodiments, the same reference signs as in the first embodiment denote elements corresponding to those in the above-described first embodiment, and a difference from the first embodiment will be described.

This second embodiment of the interposer 70 has a rib 56 protruding from the inner wall face 53*a* in the through-hole 53 in which a plurality of contacts are positioned, between the contacts 10 adjacent to each other. Since in this manner the rib whose amount of protrusion, width, and/or the like is adjusted is provided between the adjacent contacts 10, electrical characteristics of the contact 10 can be further improved. This rib 56, unlike the supporting portion 54 onto which the press-fit portion 25 of the contact 10 is press-fitted, is not required to have strength required for supporting the contact 10, and can be freely designed for the purpose of improving electrical characteristics.

Figure 6:
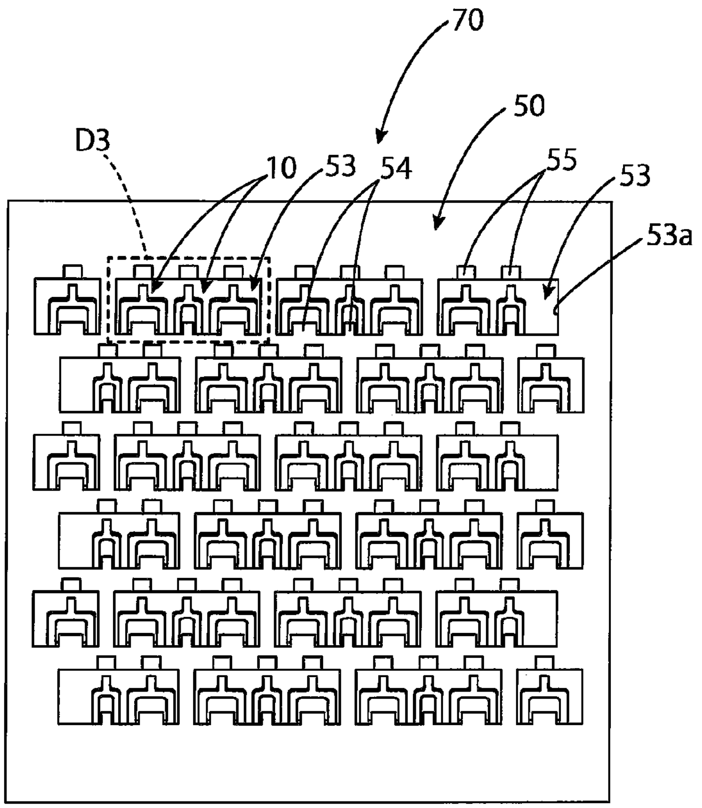
FIG. 6 is a top view of a third embodiment of the interposer of the present invention.
Figure 7A:
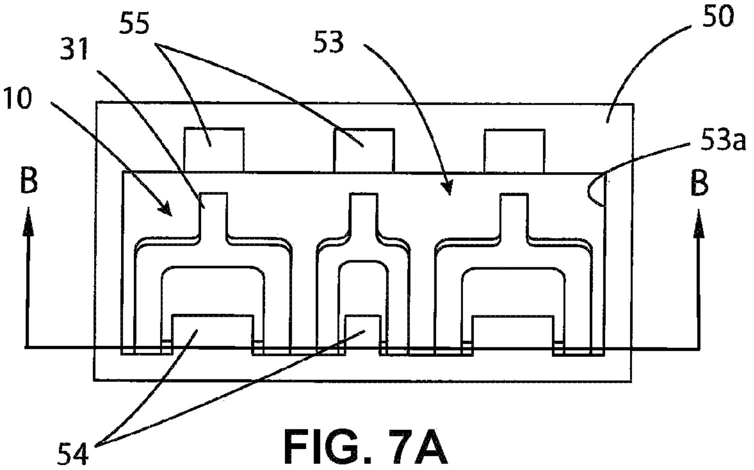
FIG. 7A is an enlarged view of a portion in a region D3 shown in dashed lines in FIG. 6.
Figure 7B:
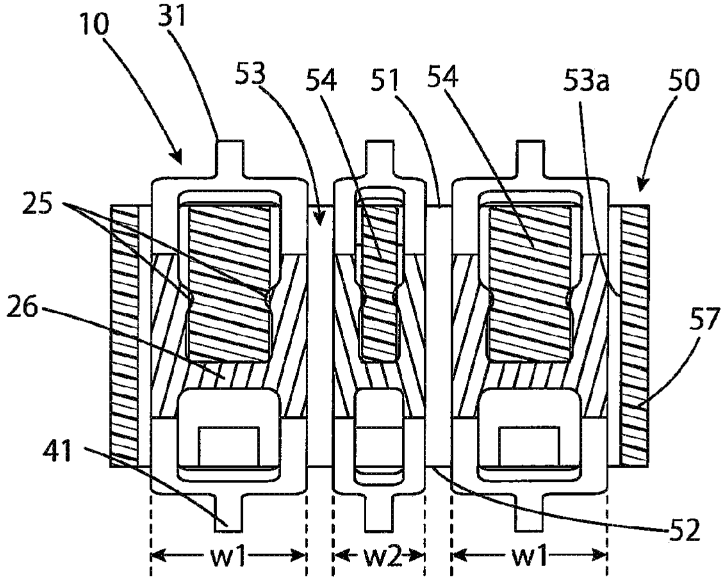
FIG. 7B is a sectional view taken along an arrowed line B-B of FIG. 7A.

FIG. 6 is a top view of a third embodiment of the interposer 70 of the present invention. In addition, FIGS. 7A and 7B are an enlarged view and a cross sectional view taken along an arrowed line B-B shown in the enlarged view, respectively, of a portion in a region D3 shown in dashed lines in FIG. 6.

In this third embodiment of the interposer 70, two types of contacts 10 having different widthwise dimensions are adopted. Accordingly, the supporting portions 54 formed in the housing 50 also have a widthwise dimension suited to the respective widths of the contacts 10. Specifically, when a through-hole 53 in which three contacts 10 are arranged is focused on, in this third embodiment, these three contacts 10 are contacts two of which at opposite ends of the arrangement have a dimension w1 in an arrangement direction larger than a dimension w2 in the arrangement direction of the rest of the contacts 10, namely the centrally arranged contact 10, other than the contacts 10 at the opposite ends of the arrangement (w1>w2).

According to the present invention, an interposer 70 having a wide range of degrees of freedom in design is achieved, such as one in which two contacts 10 at the opposite ends of the arrangement are shaped differently from contacts other than the two contacts. In this manner, a plurality of types of contacts 10 suitable for their purposes, for example, for high-speed signal transmission and for low-speed signal transmission, for signal transmission and for grounding or power supply, or the like, may be adopted in the interposer of the present invention.

Figure 8:
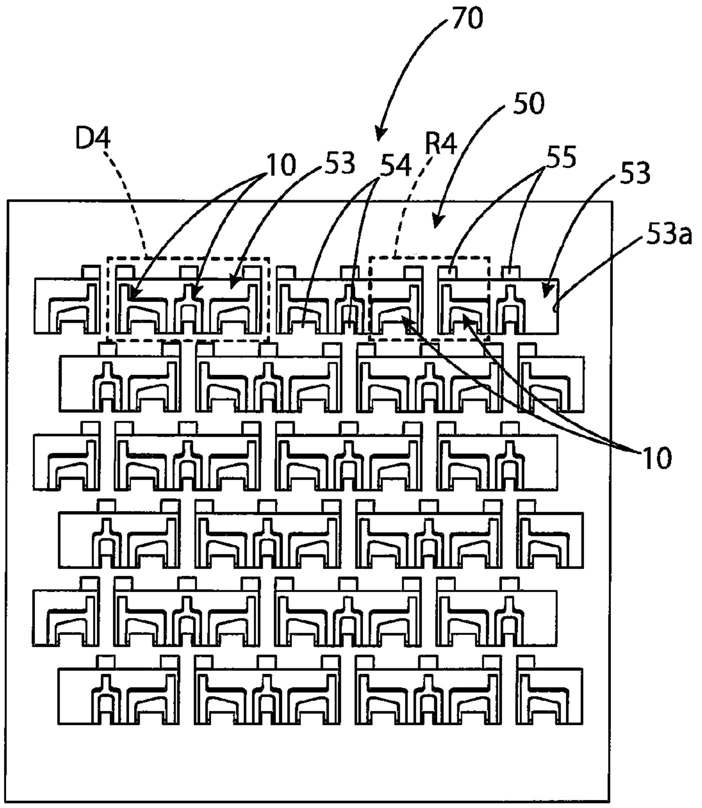
FIG. 8 is a top view of a fourth embodiment of the interposer of the present invention.
Figure 9A:
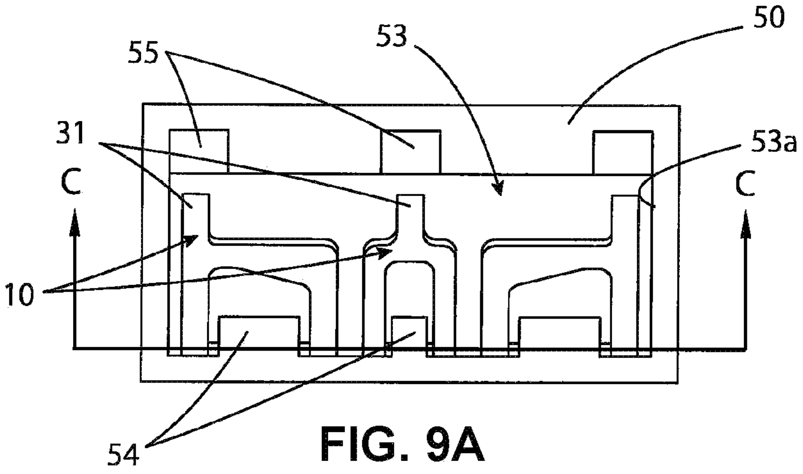
FIG. 9A is an enlarged view of a portion in a region D4 shown in dashed lines in FIG. 8.
Figure 9B:
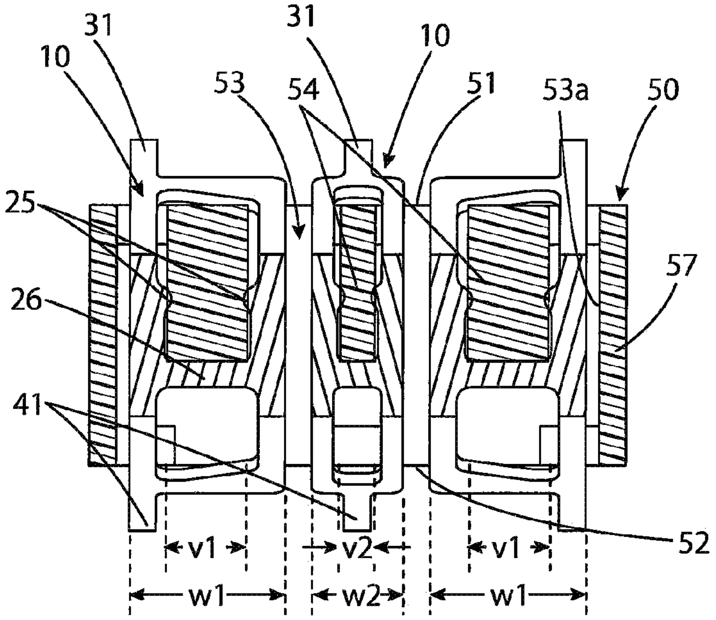
FIG. 9B is a sectional view taken along an arrowed line C-C of FIG. 9A.

FIG. 8 is a top view of a fourth embodiment of the interposer of the present invention. In addition, FIGS. 9A and 9B are an enlarged view and a cross sectional view taken along an arrowed line C-C shown in the enlarged view, respectively, of a portion in a region D4 shown in dashed lines in FIG. 8. Also in this fourth embodiment, as shown in FIGS. 9A and 9B, three contacts 10 arranged in one through-hole 53 will be focused on.

Regarding a widthwise dimension in an arrangement direction, as in the third embodiment, these three contacts 10 are contacts two of which at opposite ends of the arrangement have a dimension w1 in a direction of the arrangement larger than a dimension w2 in the direction of the arrangement of the remaining contact 10, namely the centrally arranged contact 10, other than the contacts at the opposite ends of the arrangement (w1>w2). However, when the first contact portion 31 and the second contact portion 41 formed on the contact 10 are focused on, in the third embodiment, they are formed widthwise centrally, regardless of the difference between the widthwise dimensions w1 and w2 of the contacts 10.

On the other hand, in this fourth embodiment, the first contact portion 31 and the second contact portion 41 formed on the contacts 10 at the opposite ends of the arrangement of the contacts 10 arranged in the through-hole 53 are formed in a position closer to the inner wall face 53*a* adjacent in the direction of the arrangement of the contacts 10 in the through-hole 53.

The contacts 10 at the opposite ends are assumed, by way of example, to be such that two contacts 10 adjacent to each other across a wall 57 of the housing 50 separating the through-holes 53 adjacent to each other, as shown in a region R4 in FIG. 8, are brought into contact with one pad of the IC 80 or the circuit board 90. This is advantageous when a large current capacity is required, for example, for grounding or the like. Bringing two contacts 10 into contact with one pad, however, is not necessarily required.

Figure 10A:
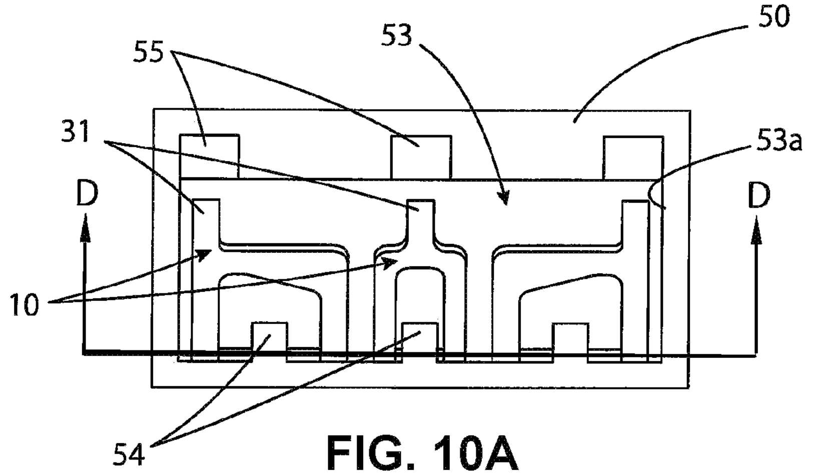
FIG. 10A is an enlarged view of a modification of the fourth embodiment shown in FIGS. 8, 9A, and 9B.
Figure 10B:
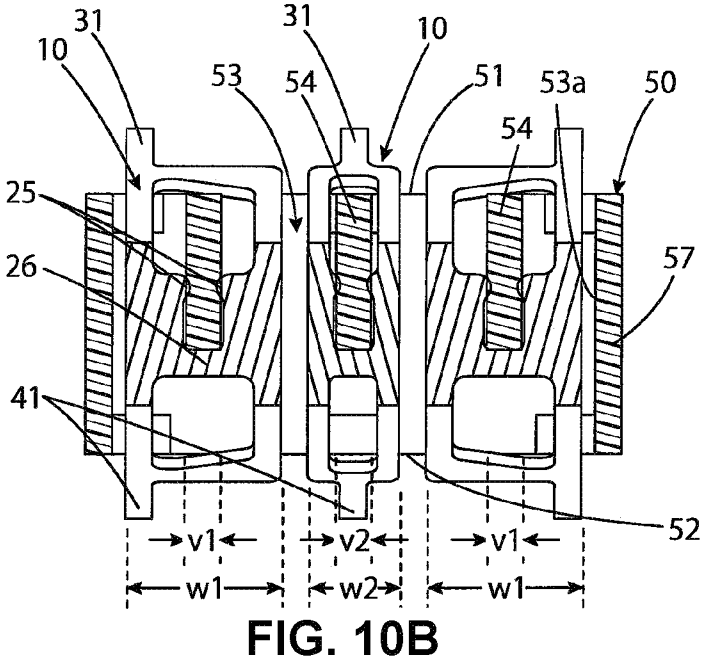
FIG. 10B is a sectional view taken along an arrowed line D-D of FIG. 10A.

FIGS. 10A and 10B are an enlarged view corresponding to FIG. 9A and a cross sectional view taken along an arrowed line D-D shown in the enlarged view, respectively, showing a modification of the fourth embodiment shown in FIG. 8 and FIGS. 9A and 9B. A difference from FIGS. 9A and 9B is a dimension in an arrangement direction of the supporting portion 54 protruding from the inner wall face 53*a* in the through-hole 53 into the through-hole 53.

In FIGS. 9A and 9B, the widthwise dimension w1 of the contacts 10 at the opposite ends in the arrangement direction is larger than the widthwise dimension w2 of the central contact 10 (w1>w2), and accordingly a widthwise dimension v1 of the supporting portions 54 at the opposite ends in the arrangement direction is larger than a widthwise dimension v2 of the central supporting portion 54 (v1>v2).

On the other hand, in the modification shown in FIGS. 10A and 10B, regarding the widthwise dimensions w1, w2 of the contacts 10, the widthwise dimension w1 of the contacts 10 at the opposite ends in the arrangement direction is larger than the widthwise dimension w2 of the central contact 10 (w1>w2), like those of the contacts 10 in FIGS. 9A and 9B, whereas, regarding the supporting portions 54, the supporting portions 54 at the opposite ends of the arrangement have the widthwise dimension v1 identical to the widthwise dimension v2 of the supporting portion 54 at the center of the arrangement (v1=v2). The contacts 10 at the opposite ends in the arrangement direction are adapted to the supporting portion 54 having the widthwise dimension (v1=v2) by widening the width of the two base portion beams 23 constituting its base portion 20, and thereby narrowing the first space 24 formed between the base portion beams 23.

As shown in this modification in FIGS. 10A and 10B, the widthwise dimensions of the supporting portions 54 may be a fixed width regardless of the widthwise dimensions of the contacts 10.

Figure 11:
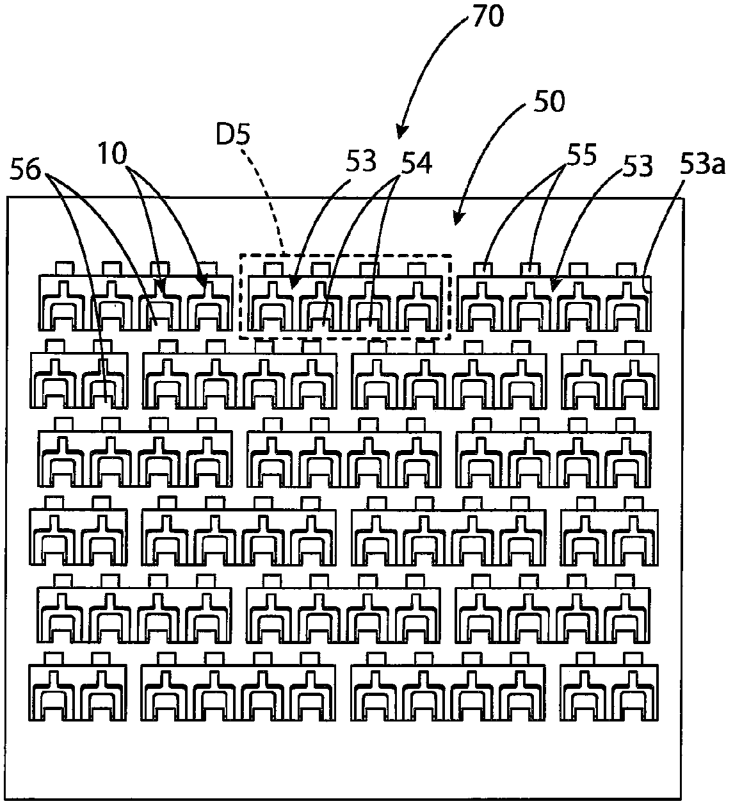
FIG. 11 is a top view of a fifth embodiment of the interposer of the present invention.
Figure 12A:
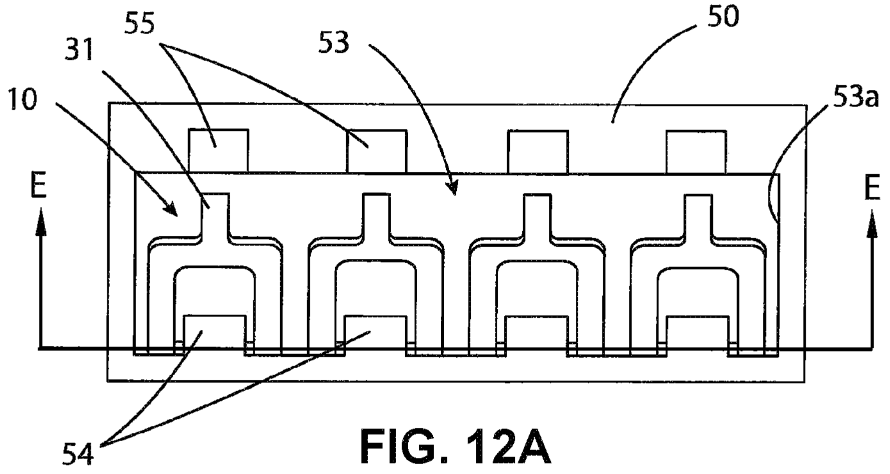
FIG. 12A is an enlarged view of a portion in a region D5 shown in FIG. 11.
Figure 12B:
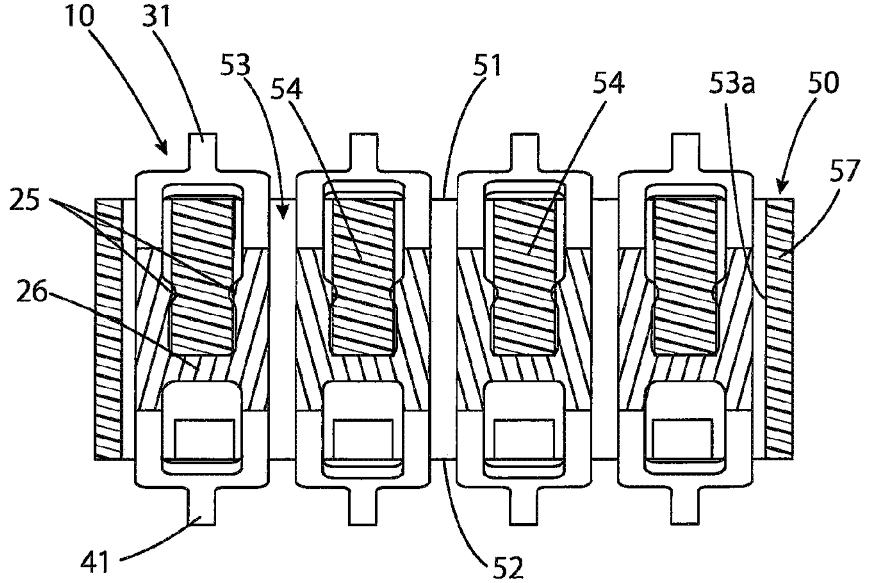
FIG. 12B is a sectional view taken along an arrowed line E-E of FIG. 12A.

FIG. 11 is a top view of a fifth embodiment of the interposer of the present invention. In addition, FIGS. 12A and 12B are an enlarged view and a cross sectional view taken along an arrowed line E-E shown in the enlarged view, respectively, of a portion in a region D5 shown in dashed lines in FIG. 11.

Figure 13:
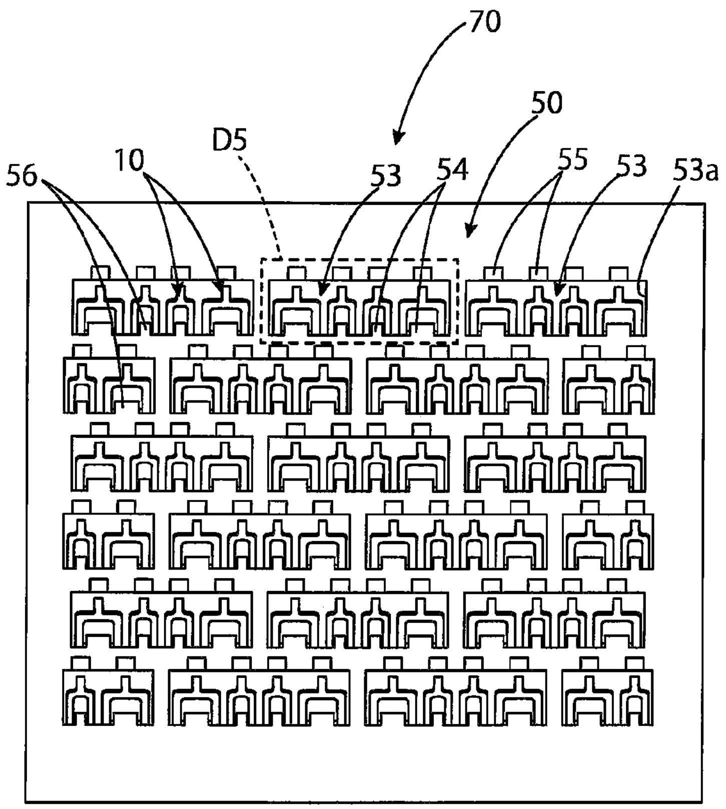
FIG. 13 is a top view of a sixth embodiment of the interposer of the present invention.
Figure 14A:
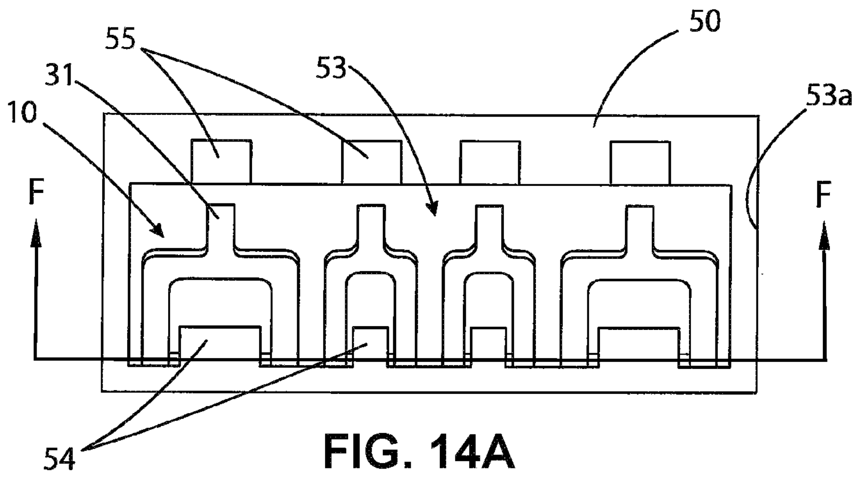
FIG. 14A is an enlarged view of a portion in a region D6 shown in FIG. 13.
Figure 14B:
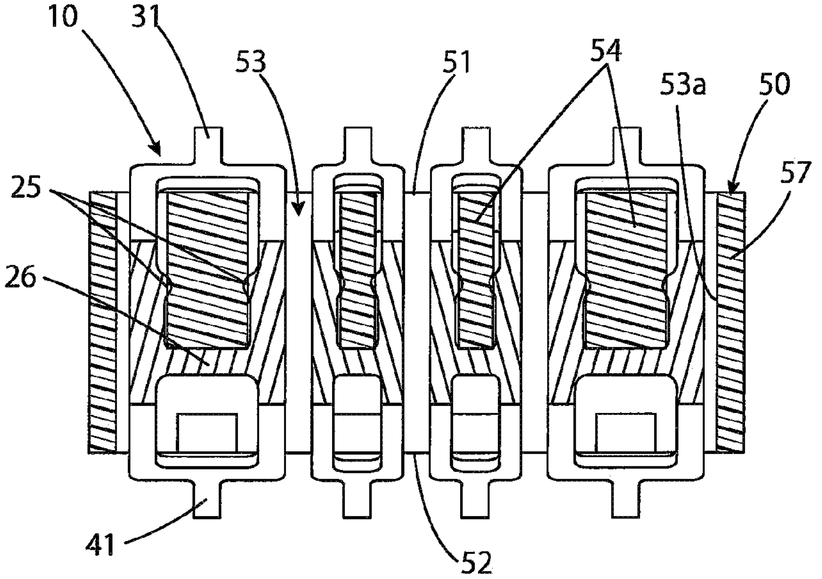
FIG. 14B is a sectional view taken along an arrowed line F-F of FIG. 14A.

FIG. 13 is a top view of a sixth embodiment of the interposer of the present invention. In addition, FIGS. 14A and 14B are an enlarged view and a cross sectional view taken along an arrowed line F-F shown in the enlarged view, respectively, of a portion in a region D6 shown in dashed lines in FIG. 13.

In these fifth and sixth embodiments, there is a through-hole 53 in which four contacts 10 are arranged. Here, in the fifth embodiment, these four contacts 10 are all contacts of the same shape. However, in the sixth embodiment, of the four contacts 10, two contacts 10 at opposite ends in the arrangement direction are contacts having the widthwise dimension w1 larger than the widthwise dimension w2 of central two contacts 10 (w1>w2).

Since the walls 57 separating the through-holes 53 decrease in number as the dimensions of a through-hole 53 increase, the strength of the housing 50 relating to this point should be taken into consideration, but the number of contacts 10 positioned in one through-hole 53 is not limited to any particular number or less.

According to each of the above embodiments, the contacts 10 adjacent to each other are positioned in proximity to each other, so that electrical characteristics can be improved.

What is claimed is:

1. A contact, comprising:
- a base portion having a first end and a second end, the base portion extends between the first end and the second end, the base portion has a pair of base portion beams having a first space therebetween, each of the base portion beams has a press-fit portion protruding from one of the base portion beams toward the other of the base portion beams, the press-fit portions are press-fittable into a housing and supportable by the housing;
- a first extending portion extending from the base portion continuously with the first end and having a first contact portion formed thereon, the first contact portion is contactable with a first electrical component; and
- a second extending portion extending from the base portion continuously with the second end and having a second contact portion formed thereon, the second contact portion is contactable with a second electrical component.

2. The contact of claim 1, wherein the base portion has a connecting column connecting the base portion beams at the second end.

3. The contact of claim 1, wherein the first extending portion has a pair of first extending portion beams extending from the base portion with a second space continuous with the first space therebetween.

4. The contact of claim 3, wherein the first extending portion has a first end column connecting the first extending portion beams together on a side of the first extending portion distal from the base portion.

5. The contact of claim 4, wherein the first contact portion protrudes from the first end column in a direction away from the base portion.

6. The contact of claim 5, wherein the second extending portion has a pair of second extending portion beams extending from the base portion with a third space separated from the first space therebetween.

7. The contact of claim 6, wherein the second extending portion has a second end column connecting the second extending portion beams on a side of the second extending portion distal from the base portion.

8. The contact of claim 7, wherein the second contact portion protrudes from the second end column in a direction away from the base portion.

9. An interposer interposed between a first electronic component and a second electronic component and electrically connecting the first electronic component and the second electronic component, the interposer comprising:
- a housing having a first face facing the first electronic component, a second face facing the second electronic component, a through-hole passing through the first face and the second face, and a supporting portion protruding from an inner wall face in the through-hole into the through-hole; and
- a contact including:
  - a base portion having a first end and a second end, the base portion extends between the first end and the second end, the base portion has a pair of base portion beams having a first space therebetween, each of the base portion beams has a press-fit portion protruding from one of the base portion beams toward the other of the base portion beams, the base portion is positioned in the through-hole, the press-fit portions are press-fit onto the supporting portion and the supporting portion supports the contact;
  - a first extending portion extending from the base portion continuously with the first end and having a first contact portion formed thereon, the first extending portion extends on the first face of the housing and the first contact portion contacts the first electrical component; and
  - a second extending portion extending from the base portion continuously with the second end and having a second contact portion formed thereon, the second extending portion extends on the second face of the housing and the second contact portion contacts the second electrical component.

10. The interposer of claim 9, wherein the supporting portion is one of a plurality of supporting portions protruding into the through-hole.

11. The interposer of claim 10, wherein the contact is one of a plurality of contacts positioned in the through-hole.

12. The interposer of claim 11, wherein the housing has a rib protruding from the inner wall face in the through-hole in which the contacts are positioned.

13. The interposer of claim 12, wherein the rib protrudes between the contacts adjacent to each other.

14. The interposer of claim 11, wherein the contacts include a plurality of types of contacts having a plurality of different widths in an arrangement direction.

15. The interposer of claim 14, wherein at least two of the contacts at opposite ends have a dimension in the arrangement direction greater than a dimension in the arrangement direction of the other contacts.

16. The interposer of claim 15, wherein at least two of the supporting portions at opposite ends have a dimension in the arrangement direction greater than a dimension in the arrangement direction of the other supporting portions.

17. The interposer of claim 15, wherein the supporting portions have dimensions in the arrangement direction identical to one another.

18. The interposer of claim 15, wherein the first contact portion and the second contact portion on the contacts at the opposite ends are positioned close to another inner wall face of the housing adjacent in the arrangement direction.

* * * * *